(12) United States Patent
Gupta (10) Patent No.: US 12,527,382 B2
(45) Date of Patent: Jan. 20, 2026

(54) BEAD AND RHINESTONE POSITIONERS

(71) Applicant: Nikhil Gupta, Schaumburg, IL (US)

(72) Inventor: Nikhil Gupta, Schaumburg, IL (US)

( * ) Notice: Subject to any disclaimer, the term of this patent is extended or adjusted under 35 U.S.C. 154(b) by 248 days.

(21) Appl. No.: 18/357,724

(22) Filed: Jul. 24, 2023

(65) Prior Publication Data

US 2024/0023680 A1 Jan. 25, 2024

Related U.S. Application Data

(60) Provisional application No. 63/391,727, filed on Jul. 23, 2022.

(51) Int. Cl.
*A44C 17/04* (2006.01)
*B32B 38/18* (2006.01)

(52) U.S. Cl.
CPC ............ *A44C 17/043* (2013.01); *B32B 38/18* (2013.01); *Y10T 156/1089* (2015.01)

(58) Field of Classification Search
CPC ...... A44C 17/043; D05B 91/04; B25G 1/107; Y10T 156/1089; B32B 38/18; B25B 9/00; B25B 9/02; B25B 11/00
See application file for complete search history.

(56) References Cited

U.S. PATENT DOCUMENTS

| | | | |
|---|---|---|---|
| 2,418,638 A | 4/1947 | Hoover | |
| 3,293,958 A | 12/1966 | Smith | |
| 6,409,059 B1 * | 6/2002 | Calvert | ............ A41D 19/01547 2/21 |
| 6,726,068 B2 * | 4/2004 | Miller | .................... D05B 91/04 223/101 |
| D611,244 S * | 3/2010 | Ozeki | ............................. D3/29 |
| 11,371,174 B2 | 6/2022 | Gupta | |
| 2004/0199204 A1 | 10/2004 | Voegele et al. | |
| 2009/0242117 A1 * | 10/2009 | Gupta | .................. A44C 17/043 156/539 |

(Continued)

FOREIGN PATENT DOCUMENTS

| | | |
|---|---|---|
| DE | 660722 C | 6/1938 |
| KR | 100966277 B1 | 6/2010 |

OTHER PUBLICATIONS

International Search Report and Written Opinion; PCT/US24/17061; Mailed Jun. 17, 2024.

(Continued)

*Primary Examiner* — Carson Gross
(74) *Attorney, Agent, or Firm* — Dunlap Bennett & Ludwig, PLLC; Anna L. Kinney (57) ABSTRACT

A tool kit includes a pair of bead and rhinestone positioners. The first positioner includes a positioning shaft attached to a first mounting thimble. The second positioner has a holding adhesive-bearing shaft attached to a second mounting thimble. The first and second mounting thimbles mount on end phalanxes of human hand digits. The positioning shaft projects outwardly along a direction aligned with the phalanx upon which the first mounting thimble is mounted. A positioning end is disposed away from the first mounting thimble. The holding adhesive-bearing shaft projects outwardly along a direction aligned with the phalanx upon which the second thimble is mounted. A holding adhesive spaced apart from the second mounting thimble is disposed on the holding adhesive-bearing shaft.

18 Claims, 7 Drawing Sheets

(56) References Cited

U.S. PATENT DOCUMENTS

| | | | | |
|---|---|---|---|---|
| 2014/0268373 A1* | 9/2014 | Selness | ............... | G02B 7/02 |
| | | | | 359/815 |
| 2019/0039231 A1 | 2/2019 | Sargsyan | | |
| 2019/0308310 A1* | 10/2019 | Gusack | ............... | B25G 1/04 |
| 2023/0060560 A1 | 3/2023 | Gupta | | |

OTHER PUBLICATIONS

International Preliminary Report on Patentabilty; PCT/US2024/017061; Mailed Feb. 4, 2025.

* cited by examiner

BEAD AND RHINESTONE POSITIONERS

CROSS-REFERENCE TO RELATED APPLICATION

This application claims the benefit of priority of U.S. provisional application No. 63/391,727, filed Jul. 23, 2022, the contents of which are herein incorporated by reference.

TECHNICAL FIELD

The present invention is directed to a tool kit for positioning beads, rhinestones, and the like on a substrate such as a fabric, artwork or craft manufactured items including scrapbooks, jewelry, containers, and clothing.

BACKGROUND

Decorative embellishments such as beads, jewels, flat backs, or other small objects are frequently used in the arts of jewelry making, garment making and other crafts. For decorative purposes, these embellishments are adhered to the desired medium. In order to form aesthetically pleasing patterns, the embellishments must carefully be positioned and secured to a substrate.

Small and irregularly shaped embellishments are difficult to pick up and manipulate with fingers. Due to the size of embellishments and the intricate designs they are a part of, it is also difficult to position them precisely in the desired location and orientation on the medium. Once positioned, attempts to apply pressure to set the embellishments onto the substrate (which typically has a structural adhesive on its surface) results in adhesive on the fingers and undesirable movement of the embellishments on the medium.

One tool kit for positioning beads and the like is seen in United States Patent Application Publication No. US2009/0242117. The tool kit disclosed has two elongate tools. Each tool has an adhesive on one end and a forked end at the other. The adhesive on one tool is used to pick up the embellishment, while the fork on the other tool is used to position and press the embellishment into the substrate. While a considerable improvement, drawbacks include having to use two tools which can easily be mislaid during a project, as well as limited manipulation capability because of the elongate structure of the two tools.

SUMMARY OF INVENTION

There is provided in accordance with the present invention bead and rhinestone positioners in the form of a paired set of positioners, each attachable to a digit on the hand of a user. One tool is provided with an adhesive end, while the other tool is provided with a positioning end. In a preferred embodiment of the device, there is provided a tool kit comprising a pair of bead and rhinestone positioners, including a first bead and rhinestone positioner and a second bead and rhinestone positioner, said first bead and rhinestone positioner comprising a positioning shaft attached to a first mounting thimble, said second bead and rhinestone positioner comprising a holding adhesive-bearing shaft attached to a second mounting thimble. Both the first mounting thimble and the second mounting thimble are configured to mount about a distal phalanx of a digit of a human hand; wherein the positioning shaft is positioned on the first mounting thimble to project outwardly along a direction aligned with the distal phalanx of the digit of the hand upon which the first mounting thimble is mounted, with a positioning end of the positioning shaft being disposed away from the first mounting thimble; and wherein the holding adhesive-bearing shaft is positioned on the second mounting thimble to project outwardly along a direction aligned with the distal phalanx of the digit of the hand upon which the second thimble is mounted, the holding adhesive-bearing shaft having disposed thereon a holding adhesive spaced apart from the second mounting thimble.

Instead of mounting thimbles, one may utilize other ring-like or annular assemblies and structures if so desired.

Further details and advantages will be apparent from the discussion which follows and the appended drawings.

BRIEF DESCRIPTION OF DRAWINGS

The invention is described below in connection with the Figures wherein like numerals designate similar parts and wherein.

DETAILED DESCRIPTION

The invention is described below in connection with the drawings, consistent with the following definitions.

"Annular" and like terminology refers to a cross-section of a component, referring to a ring-like arcuate cross-section. An annular cross-section more specifically refers to an outwardly convex structure extending around at least about 225° of a generally circular arc, preferably from 260° or so up to 360° in the case of a thimble, as seen in a preferred embodiment.

"Holding adhesive", "holding adhesive composition" and like terminology refers to non-structural pressure-sensitive adhesives suitable for picking up and positioning small decorative objects such as beads, rhinestones or the like. The holding adhesive material must be durable enough for repeated use and suitably tacky to pick up an embellishment, yet sufficiently non-adherent to permit release and separation of the embellishment from the holding adhesive without undue force. Suitable holding adhesives include putties and waxes. Particularly preferred are waxes such as beeswax, vegetable waxes, mineral waxes, or synthetic waxes.

Figure 1:
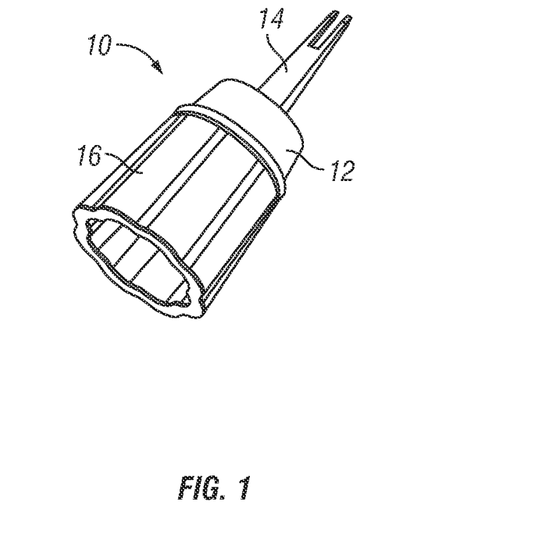
FIG. 1 is a view in perspective of a first bead and rhinestone positioner.
Figure 3:
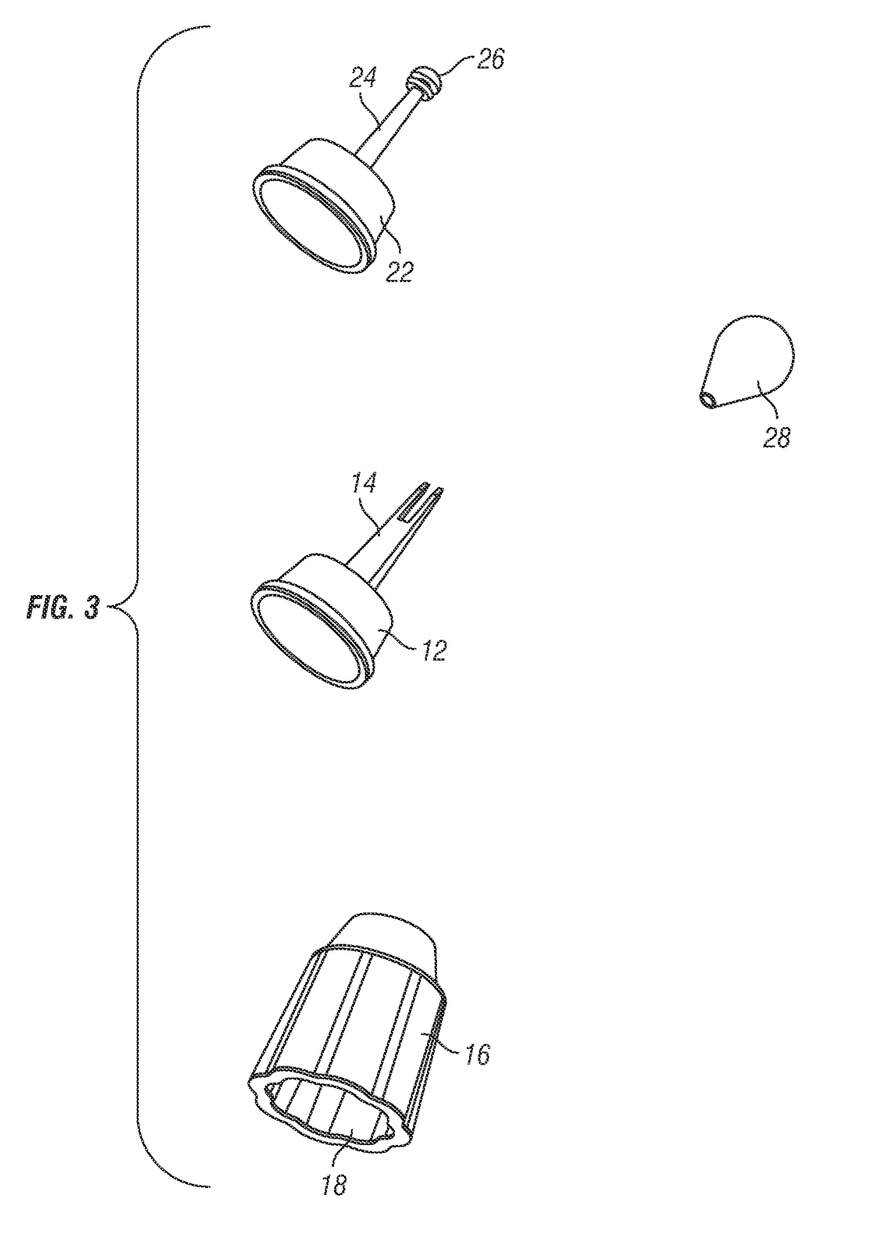
FIG. 3 is an exploded view of the various components of the first and second bead and rhinestone positioners, viewed in perspective.

Referring to the Figures, there is illustrated a first bead and rhinestone positioner 10, including a cap 12 with a forked shaft 14 mounted on cap 12. Cap 12 is made of polycarbonate and is mounted on a thimble 16 made of silicone rubber. Thimble 16 also has a scalloped construction with an annular cross-section 18 which is expandable for comfort and fit. Shaft 14 is integrally formed with cap 12.

Figure 2:
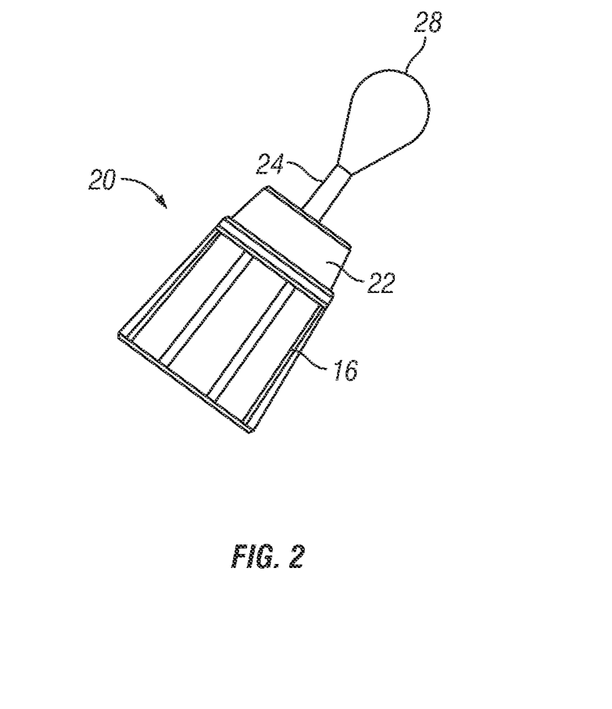
FIG. 2 is a view in perspective of a second bead and rhinestone positioner.

Also provided is a second bead and rhinestone positioner 20 which has a cap 22, a holding adhesive-bearing shaft 24 with an adhesive mount 26 having a ball of holding adhesive 28, preferably in the form of a wax. Cap 22 is also secured to a thimble 16 as shown. Shaft 24 is integrally formed with cap 22.

Figure 4:
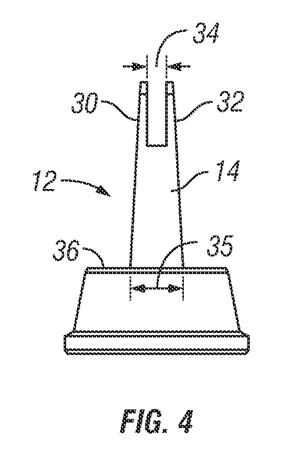
FIG. 4 is a front view in elevation of the cap and forked shaft of the first bead and rhinestone positioner.
Figure 5:
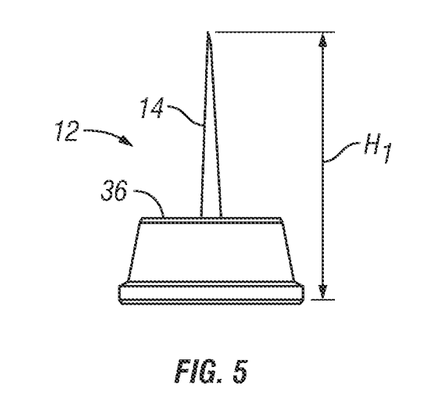
FIG. 5 is a side view in elevation of the cap and forked shaft of the first bead and rhinestone positioner.
Figure 6:
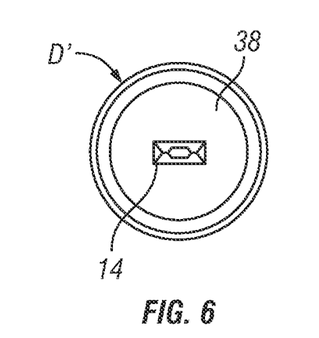
FIG. 6 is a bottom plan view of the cap and forked shaft of the first bead and rhinestone positioner.

FIGS. 4 through 6 illustrate cap 12 in more detail along with shaft 14 which has a pair of opposed prongs 30, 32 spaced a distance 34 of about 2-3 mm, slightly less than the width of shaft 14 at its upper portion. Shaft 14 tapered, having a width at 35 at its lower portion of 4-5 mm where it is joined to an upper planar portion 36 of cap 12. A lower opening 38 of cap 12 has a diameter D' of 15-18 mm at the bottom of its frustoconical shape. Cap 12 has an overall height, H1 of about 25 mm.

Figure 7:
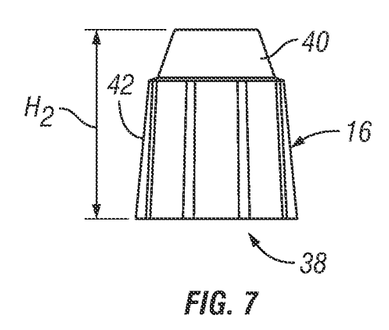
FIG. 7 is a view in elevation of the mounting thimble utilized in the construction of the first and second bead and rhinestone positioners.
Figure 8:
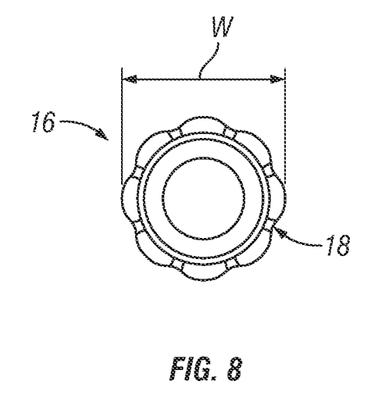
FIG. 8 is a top plan view of the mounting thimble utilized in the construction of the first and second bead and rhinestone positioners.

Thimble 16 is shown in more detail in FIGS. 7, 8. Thimble 16 is of frustoconical construction made of silicone rubber with a scalloped annular profile 18 having an overall width, W, of about 20 mm at its lower extremity and an overall height, H2, of about 24-26 mm. An upper frustoconical section 40 is of greater taper than a lower frustoconical section 42.

Figure 9:
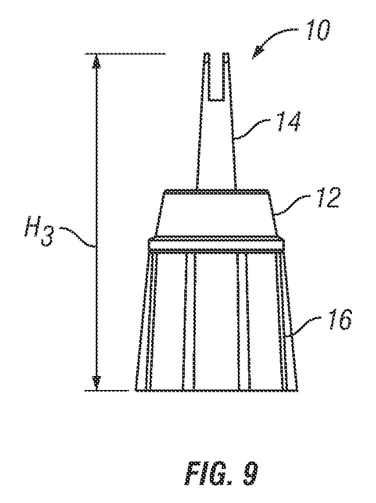
FIG. 9 is a front view in elevation of the first bead and rhinestone positioner.
Figure 10:
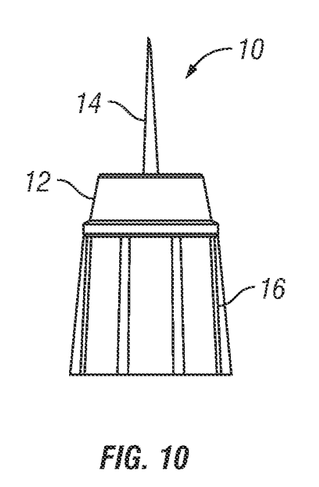
FIG. 10 is a side view in elevation of the first bead and rhinestone positioner.
Figure 11:
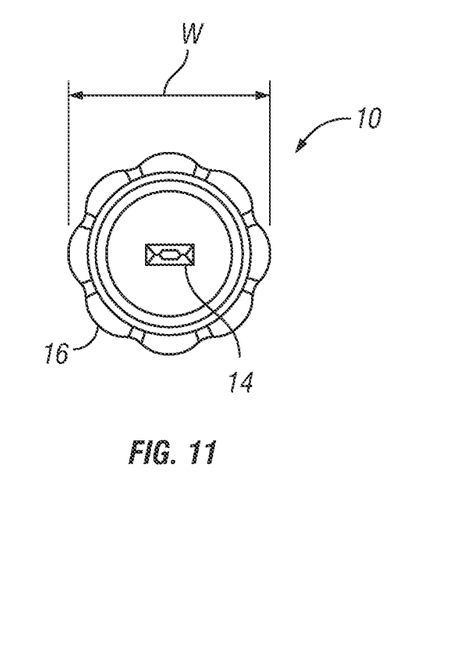
FIG. 11 is a top plan view of the first bead and rhinestone positioner.

Assembled first positioner 10 is shown in FIGS. 9 through 11. Positioner 10 has an overall height, H3, of about 42 mm with the various features shown and described above.

Figure 12:
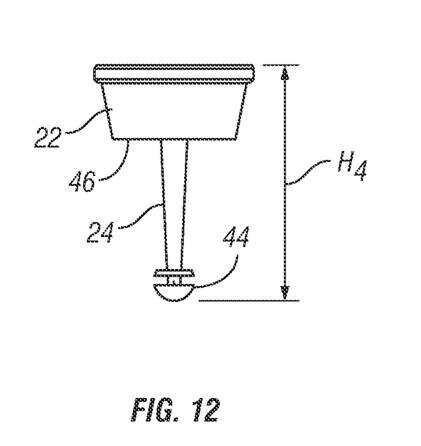
FIG. 12 is an inverted view in elevation of the cap and adhesive-bearing shaft of the second bead and rhinestone positioner.
Figure 13:
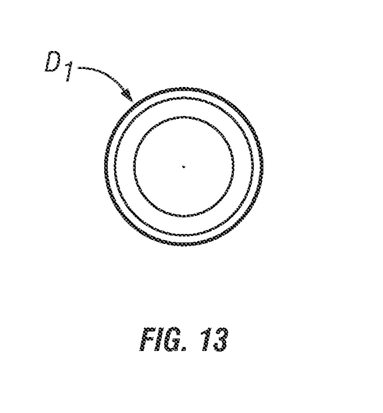
FIG. 13 is a bottom plan view of the cap and adhesive-bearing shaft of the second bead and rhinestone positioner.

In FIGS. 12, 13 there is shown cap 22 of second bead and rhinestone positioner with adhesive-bearing shaft 24 integrally formed of polycarbonate with cap 22. Shaft 24 has an adhesive mount 26 in the form of a ridged bulbous projection 44. Shaft 24 projects away from an upper planar surface 46 of cap 22, which has an overall height, H4, of about 25 mm, and a lower diameter, D1, of about 15-18 mm.

Figure 14:
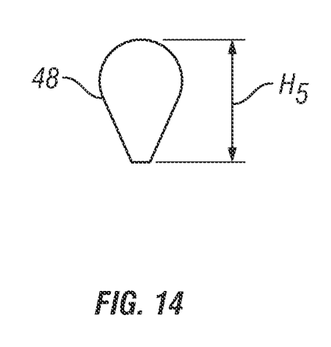
FIG. 14 is a view in elevation of a wax ball for mounting on the adhesive-bearing shaft of the second bead and rhinestone positioner.
Figure 15:
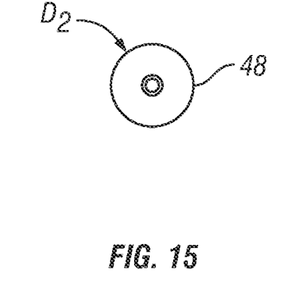
FIG. 15 is a bottom plan view of the wax ball of FIG. 14.

FIGS. 14, 15 show a ball of holding adhesive wax 48. Holding wax 48 has a height, Hs, of about 14 mm and a maximum diameter, D2, of about 10 mm.

Figure 16:
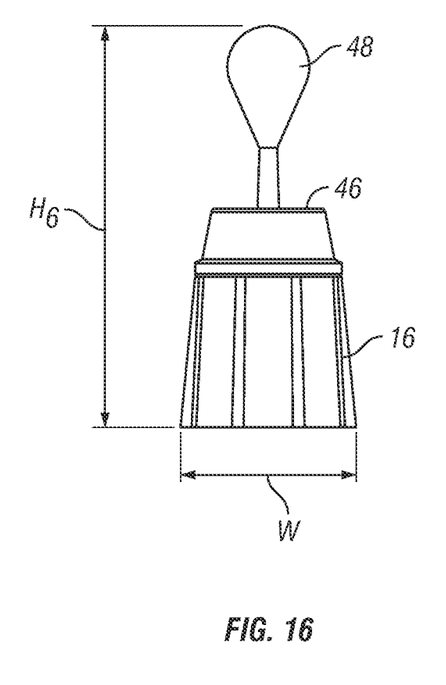
FIG. 16 is an assembled view in elevation of second bead and rhinestone positioner 20.

FIG. 16 illustrates the second assembled bead and rhinestone positioner 20, having an overall height, H6, of about 47 mm when the wax is secured to ridged bulbous projection 44. The second positioner has a width, W, of about 20 mm.

Figure 17A:
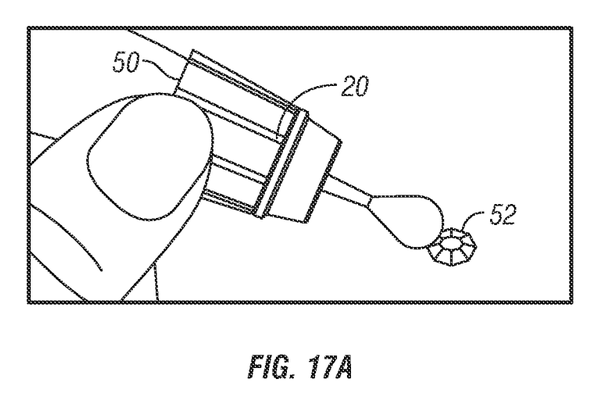
FIGS. 17A, 17B and 17C are illustrations of the operation of the first and second bead and rhinestone positioning tools to select, position and press an embellishment onto a substrate.
Figure 17B:
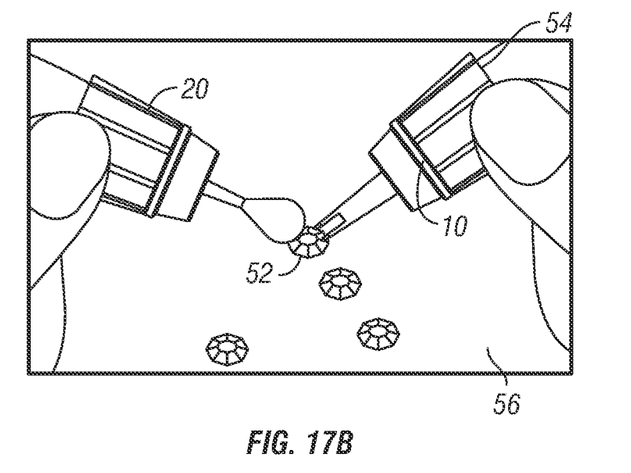
Figure 17C:
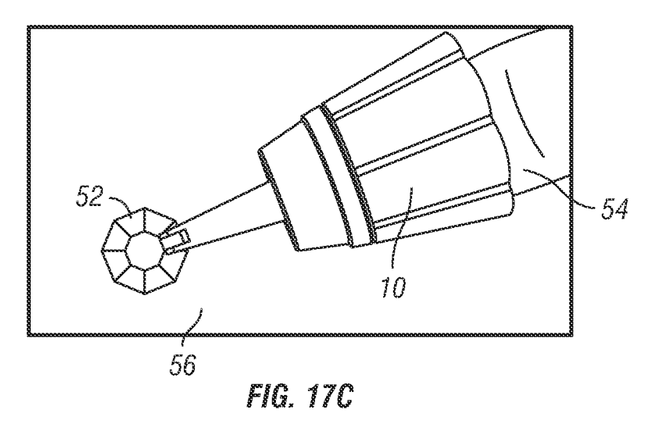

Use of the inventive bead and rhinestone positioner is illustrated in FIGS. 17A, 17B and 17C. In FIG. 17A, second positioner 20 is disposed on the tip 50 of the index finger of a user and is used to select an embellishment in the form of a flattened bead 52 and adhere it to the holding adhesive wax ball. In FIG. 17B a user disposes the first positioner on the tip 54 of the index finger of the other hand and uses forked shaft 14 to remove the bead from the holding adhesive wax and position the bead in a structural adhesive on a substrate 56. In FIG. 17C a user presses the bead into the structural adhesive on the substrate in order to secure it in the desired position.

It is appreciated from FIGS. 17A, 17B and 17C and the foregoing discussion that the bead and rhinestone positioners are secured about the distal phalanxes of a user's index fingers by annular thimbles 16 such that shafts 14, 24 extend in the direction of the distal phalanxes of the index fingers of a user for ease of manipulation of the embellishments.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the foregoing description including the Detailed Description and Background of the Invention, the disclosures of which are all incorporated herein by reference, further description is deemed unnecessary. In addition, it should be understood from the foregoing discussion that aspects of the invention and portions of various embodiments may be combined or interchanged either in whole or in part. Furthermore, those of ordinary skill in the art will appreciate that the foregoing description is by way of example only and is not intended to limit the invention.

What is claimed is:

1. A tool kit comprising a pair of bead and rhinestone positioners, including a first bead and rhinestone positioner and a second bead and rhinestone positioner,
    said first bead and rhinestone positioner comprising a positioning shaft attached to a first mounting thimble,
    said second bead and rhinestone positioner comprising a holding adhesive-bearing shaft attached to a second mounting thimble,
    wherein the first mounting thimble and second mounting thimble are made of rubber, have a frustoconical shape and have rigid caps on their upper portions,
    wherein the first mounting thimble and the second mounting thimble are configured to mount about a distal phalanx of a digit of a human hand;
    wherein the positioning shaft is centrally located on an upper surface of the first mounting thimble to project outwardly along a direction aligned with the distal phalanx of the digit of the hand upon which the first mounting thimble is mounted, with a positioning end of the positioning shaft being disposed away from the first mounting thimble;
    wherein the holding adhesive-bearing shaft is centrally located on an upper surface of the second mounting thimble to project outwardly along a direction aligned with the distal phalanx of the digit of the hand upon which the second thimble is mounted, the holding adhesive-bearing shaft having disposed thereon a holding adhesive spaced apart from the second mounting thimble, and
    wherein the positioning shaft and the holding adhesive-bearing shaft have a length of from 10 to 25 mm.

2. The tool kit according to claim 1, wherein the first and second mounting thimbles have an upper frustoconical section and a lower frustoconical section and the rigid caps have a frustoconical shape.

3. The tool kit according to claim 1, wherein the rubber mounting thimbles are made of a silicone rubber.

4. The tool kit according to claim 1, wherein the first and second mounting thimbles have a scalloped cross-section.

5. The tool kit according to claim 1, wherein the first mounting thimble and the second mounting thimble have a lower diameter of from 15 to 30 mm.

6. The tool kit according to claim 1, wherein the first and second mounting thimbles have an overall height of from 15 to 35 mm.

7. The tool kit according to claim 6, wherein the first and second mounting thimbles have an overall height of from 20 to 30 mm.

8. The tool kit according to claim 1, wherein the positioning shaft and the holding adhesive-bearing shaft have a length of from 12 to 20 mm.

9. The tool kit according to claim 1, wherein the rigid caps are made of polycarbonate.

10. The tool kit according to claim 1, wherein the positioning shaft is integrally formed with the cap on the first mounting thimble.

11. The tool kit according to claim 1, wherein the holding adhesive-bearing shaft is integrally formed with the cap on the second mounting thimble.

12. The tool kit according to claim 1, wherein the holding adhesive is a wax.

13. The tool kit according to claim 12, wherein the wax is selected from bees' waxes and synthetic waxes.

14. The tool kit according to claim 1, wherein the positioning shaft is a forked shaft with a plurality of prongs at its positioning end.

15. The tool kit according to claim 1, wherein the first mounting thimble and second mounting thimble are made of silicone rubber, have a frustoconical shape with upper and lower frustoconical sections of different tapers, and have rigid polycarbonate caps on their upper portions, and wherein the positioning shaft and holding adhesive-bearing shaft are integrally formed with their respective caps.

16. The tool kit according to claim 1, wherein the positioning shaft and the holding adhesive-bearing shaft have a length of from 12 to 20 mm, and wherein the first and second mounting thimbles have an overall height of from 20 to 30 mm, such that the shaft length is shorter than the thimble height.

17. The tool kit according to claim 1, wherein the holding adhesive is a wax ball having a height of about 14 mm and a maximum diameter of about 10 mm, and wherein the adhesive-bearing shaft includes a ridged bulbous projection for securing the wax ball.

18. The tool kit according to claim 1, wherein the first and second mounting thimbles have a scalloped cross-section for expandable fit, and wherein the positioning shaft is a forked shaft with prongs spaced 2-3 mm apart for manipulating embellishments having widths slightly larger than the prong spacing.

* * * * *